United States Patent
Ott (10) Patent No.: US 10,072,720 B2
(45) Date of Patent: Sep. 11, 2018

(54) KNITTED ELASTOMERIC VIBRATORY DAMPING APPARATUS

(71) Applicant: ITT Manufacturing Enterprises LLC, Wilmington, DE (US)

(72) Inventor: Mark J. Ott, Orchard Park, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 14/574,631

(22) Filed: Dec. 18, 2014

(65) Prior Publication Data

US 2016/0178025 A1 Jun. 23, 2016

(51) Int. Cl.
| | |
|---|---|
| *F16M 1/00* | (2006.01) |
| *F16F 7/108* | (2006.01) |
| *F16F 1/362* | (2006.01) |
| *D04B 1/18* | (2006.01) |
| *D04B 1/22* | (2006.01) |

(52) U.S. Cl.
CPC .............. *F16F 7/108* (2013.01); *D04B 1/18* (2013.01); *D04B 1/22* (2013.01); *F16F 1/362* (2013.01)

(58) Field of Classification Search
CPC ...... F16F 1/36; F16F 1/362; F16F 3/08; F16F 7/108; D04B 1/18; D04B 1/22; D04B 1/225
USPC ................. 267/136, 141, 147; 188/379, 380
See application file for complete search history.

(56) References Cited

U.S. PATENT DOCUMENTS

| | | | |
|---|---|---|---|
| 1,948,844 A | 2/1934 | Dawes | |
| 2,300,241 A | 10/1942 | Van Voorhis | |
| 2,869,858 A | 1/1959 | Hartwell | |
| 3,151,856 A | 10/1964 | Bresk et al. | |
| 3,578,028 A | 5/1971 | Roberts | |
| 3,667,142 A * | 6/1972 | Goodloe | D04B 1/22 38/66 |
| 3,677,265 A | 7/1972 | Brabazon | |

(Continued)

FOREIGN PATENT DOCUMENTS

| | | |
|---|---|---|
| EP | 0 168 767 A2 | 1/1986 |
| EP | 0 735 949 B1 | 11/1997 |

(Continued)

OTHER PUBLICATIONS

Bouncing Into Fashion [H Edition]; Chandler; Jul. 11, 2011; 4 pages.

(Continued)

*Primary Examiner* — Pamela Rodriguez (74) *Attorney, Agent, or Firm* — Barclay Damon, LLP (57) ABSTRACT

A flexible vibratory damping apparatus is defined by a sheet-like component that is formed from threads made from at least one elastomeric material and formed into a knitted configuration. The knitted configuration is defined by a plurality of adjacent loops wherein the sheet-like component can be wrapped about a structural component under load or otherwise attached thereto. Under an applied load, the adjacent loops act independently in terms of resonance wherein the size of the adjacent loops, the density of the formed mesh and the properties of the elastomeric material used can be suitably varied as needed in order to adjust or tune the damping characteristics of the apparatus. In at least one version, a constraining layer can also be applied onto at least a portion of the apparatus.

29 Claims, 8 Drawing Sheets

(56) References Cited

U.S. PATENT DOCUMENTS

| | | |
|---|---|---|
| 5,855,733 A | 1/1999 | Douglas et al. |
| 5,918,319 A | 7/1999 | Baxter |
| 6,227,010 B1 | 5/2001 | Roell |
| 6,342,457 B1 | 1/2002 | Best et al. |
| 6,516,637 B1 | 2/2003 | Fancher et al. |
| 6,737,370 B2 | 5/2004 | Espe |
| 6,776,769 B2 | 8/2004 | Smith |
| 7,043,329 B2 | 5/2006 | Dias et al. |
| 7,647,946 B2 | 1/2010 | Mirmand et al. |
| 8,136,884 B2 | 3/2012 | Bullard et al. |
| 8,332,168 B2 | 12/2012 | Mansfield |
| 8,419,502 B2 | 4/2013 | Liu |
| 8,695,668 B2 | 4/2014 | Duchemin et al. |
| 8,772,187 B2 | 7/2014 | Ugbolue et al. |
| 2003/0024584 A1 | 2/2003 | Godel et al. |
| 2003/0096547 A1 | 5/2003 | Oka et al. |
| 2009/0181590 A1 | 7/2009 | Hansen et al. |
| 2010/0112275 A1 | 5/2010 | Hansen et al. |
| 2012/0148772 A1 | 6/2012 | Avula et al. |
| 2012/0153703 A1 | 6/2012 | Bogard et al. |
| 2013/0105262 A1 | 5/2013 | Weisbeck |
| 2013/0284299 A1 | 10/2013 | Schooley et al. |

FOREIGN PATENT DOCUMENTS

| | | |
|---|---|---|
| EP | 1 040 910 B1 | 12/2001 |
| EP | 1 302 578 A2 | 4/2003 |
| EP | 1 092 797 B1 | 7/2004 |
| EP | 2 231 909 A1 | 9/2010 |
| EP | 2 438 224 A1 | 4/2012 |
| EP | 2 648 558 A1 | 10/2013 |
| GB | 698837 | 10/1953 |
| GB | 2 111 824 A | 7/1983 |
| WO | WO 2012/078833 A1 | 6/2012 |

OTHER PUBLICATIONS

Easyclean and Anti-Slip Knit Silicone; Alibaba; http://www.alibaba.com/product-detail/easyclean-and-anti-slip-knit-silicone-543319360.html; 2014; 3 pages.

European Search Report for EP 15 198 786.4; Dated: May 11, 2016; 8 pages.

European Office Action for EP 15 198 786.4; dated Jun. 6, 2017; 3 pages.

European Office Action for EP 15 198 786.4; dated Dec. 12, 2017; 2 pages.

* cited by examiner

KNITTED ELASTOMERIC VIBRATORY DAMPING APPARATUS

TECHNICAL FIELD

This application generally relates to the field of damping of structures and more specifically to a vibratory damping assembly that is configured to overlay or otherwise be disposed in relation to a structure under load, in which the flexible vibratory damping assembly is defined by an elastomeric material made up of a plurality of adjacent loops that are formed in a knitted, weaved, loomed, stitched or crocheted configuration.

BACKGROUND

Known assemblies are configured to provide damping of structures against dynamic loads, such as those created by oscillating sources, in order to prevent premature failures. These damping assemblies can include, for example, various damping elements that are axially disposed in relation to a defined structure or housing. As the load is applied, dynamic reactions within the assembly absorbs energy, thereby damping the applied load. One example of a hydraulically controlled damping assembly of this type is described in U.S. Pat. No. 3,151,856, the entire contents of which are herein incorporated by reference.

Figure 1:
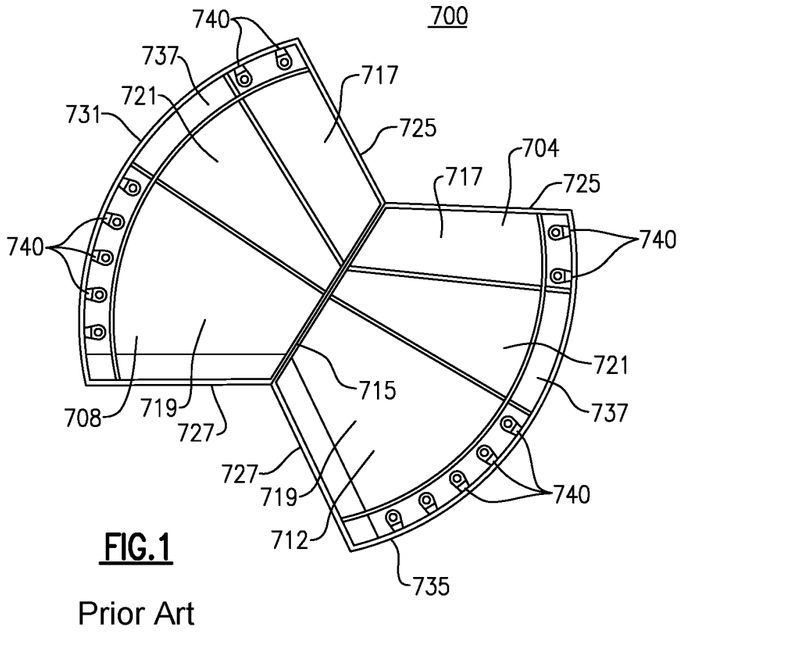
FIG. 1 is a perspective view of a known vibratory damping apparatus in an unassembled condition.
Figure 2:
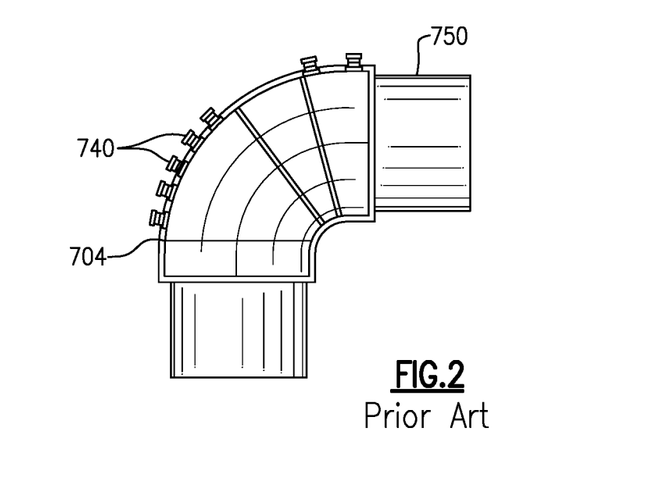
FIG. 2 is a perspective view of the vibratory damping apparatus of FIG. 1, shown as attached to a structural component.

Another version of a vibratory damping apparatus is shown in FIGS. 1 and 2. This damping apparatus 700 is described by a bag-like structure 704 formed from at least one sheet of a fluid impermeable material, such as Nomex. The structure 704 is defined by a top edge 725, a bottom edge 727, and respective outer edges 731, 735 as well as an optional center seam 715, separating the structure 704 into mirrored sides 708, 712 as well as a plurality of interior cavities 717, 719, 721 in which at least some of the interior cavities are at least partially filled with a granulated damping material. A plurality of engagement members 740 provided along the outer edges 731, 735 and more specifically border portions 737 and the flexible nature of the material enable the enclosure 704 to be flexibly wrapped about a physical object, such as a pipe 750. Additional details relating to this latter damping apparatus are provided in U.S. Patent Application Publication No. 2013-0105262A1, the entire contents of which are herein incorporated by reference.

While each of the foregoing assemblies are quite effective in damping applied loads, there is considerable complexity for each of these described structures in terms of the number of working parts and associated costs that are required to manufacture same and to effect repair in the event of failure. In addition, the type of structures and arrangement of the various damping elements to which these assemblies can be suitably mounted can be somewhat limited due to their shape, functionalities, and/or size, among other concerns and also based on environments, including input loads imparted to a structure and the associated damping assembly. In addition, this type of assembly also insulates the device to which the assembly is attached. This insulation can be an undesirable attribute, which produces overheating.

As a result, there is a general and pervasive need in the field to develop a vibratory damping assembly that can be effectively used to provide damping over a broad spectrum of input frequencies and in which the apparatus can be used in connection with numerous and varied types of structures with little or no modifications, as well as providing effective damping under various types of loading conditions and environments and further provide ventilation of the assembly to which it is attached.

BRIEF DESCRIPTION

Therefore and according to a first aspect, there is provided a vibratory damping apparatus comprising at least one knitted section made from an elastomeric material, the at least one knitted section being defined by a plurality of adjacent elastomeric loops that are independently influenced by input loads. As described herein, the term "knitted" refers to any method for which an elastomeric cord(s) or thread(s) can be assembled to create a series of intertwined loops or layers of construction including but not limited to knitting, crocheting, looming, weaving, stitching and the like.

The size of the elastomeric cord and adjacent intertwined loops that are formed, as well as the voided density of the created section(s) and the properties of the elastomeric material, enables a virtually unlimited number of configurations and varied designs in order to effectively tune the damping apparatus for loading conditions/environments that may be encountered.

According to another aspect, there is provided a method of manufacturing a vibratory damping apparatus, the method comprising the steps of providing at least one section of at least one elastomeric material and forming a plurality of adjacent individual loops from the at least one elastomeric material into a knitted arrangement. In addition, these various configurations can be combined and assembled to further influence performance characteristics and benefits.

In at least one version, the knitted arrangement is defined by using elastomeric thread or cord wherein at least one of the density of the resulting mesh, the elastomeric thread diameter and/or loop size of at least one portion of the knitted arrangement can be suitably configured or varied in order to tune damping characteristics of the apparatus in regard to a structure under load.

According to at least one embodiment, at least one outer layer can be added to at least a portion of the formed knitted arrangement in order to create a constrained layer.

According to another aspect, there is provided a method for damping a structure or structural component comprising the steps of providing a sheet-like section defined by a elastomeric material that is formed into a knitted arrangement, the knitted arrangement including a plurality of adjacent loops; and attaching the sheet-like section to a structure or structural component under load wherein the adjacent loops are caused to vibrate independently based upon the load applied The sheet-like section can be configured to permit it to be wrapped about a structural component, such as a pipe, or the sheet-like section can be otherwise attached.

In at least one version, the method can further include the step of applying a rigid or semi-rigid outer layer onto at least a portion of the sheet-like section. This layer can be metal, by way of example.

Advantageously, the herein described damping apparatus is highly flexible and easily conforms thereby enabling the apparatus to be wrapped about or hung from structural components under load without any or significant modification thereto. As a result, the herein described damping apparatus can be effectively used in conjunction with a varied number of different structures having conventional and/or non-conventional shapes or configurations.

Additionally, the herein described damping apparatus is simple in terms of its overall construction and ease of use in that the entire apparatus can be fabricated as a single or unitary lightweight component made from one or several elastomers. As such, the herein described apparatus has no moving parts, such as pistons or springs, that can prematurely fail and require replacement of either the damping apparatus and/or the component under load. Yet, the unitary apparatus is reliant upon the independence of the individual loops and certain additive features based upon contact between adjacent loops of the knitted configuration to achieve desired damping. In addition, the herein described damping apparatus is capable of absorbing a broad spectrum of input energy and can reliably and effectively provide damping over a broad range of input frequencies.

Still further, the knitted character of the herein described vibratory damping apparatus also enables heat dissipation, for example, when the apparatus is wrapped in overlaying relation or hung from structural components having hot surfaces, such as pipes and the like.

These and other features and advantages will be readily apparent from the following Detailed Description, which should be read in conjunction with the accompanying drawings.

DETAILED DESCRIPTION

The following description relates to various embodiments of a flexible apparatus formed into a knitted configuration that is suitable for purposes of damping a structural component under load. All described embodiments are intended to be merely exemplary of the inventive concepts described herein. As such, it will be readily apparent that other suitable versions can be contemplated by those of sufficient skill. In addition and throughout the course of this description, various terms are used in order to provide an effective frame of reference with regard to the accompanying drawings. These terms, which may include "first", "second", "lateral", "top", "upper", "lower", "above" and "below" among others, are not intended to limit the overall scope of the inventive concepts, including the appended claims, unless so specifically indicated.

It should further be noted that the accompanying drawings are intended to fully illustrate the salient features of the herein described vibratory damping apparatus in accordance with the various embodiments. As a result, these drawings are not to scale and should not be relied upon by the reader for that purpose.

For purposes of this description, the terms "a", "an", "the", and "said" refers to one or more than one.

As used herein, the terms "comprising", "comprises", and "comprise" are open-ended terms definitionally used to transition from a subject recited before the term to one or more elements recited after the term, where the element or elements listed after the term are not necessarily the only elements that make up the subject.

As used herein, the terms "containing", "contains" and "contain" have the same open-ended meaning as "comprising", "comprises", and "comprise".

As used herein, the terms "including", "includes", and "include" have the same open-ended meaning as "comprising", "comprises", and "comprise".

In this application, the term "knitted" refers to a configuration defined by intertwining threads of at least one material into a series of connected loops that can be formed into a two-dimensional pattern. This term as used throughout applies to any method for which an elastomeric cord can be assembled to create intertwined loops or layers of construction including but not limited to knitting, crocheting, looming, weaving, stitching and the like.

The term "elastomer" or "elastomeric material" for purposes of this application refers to any natural or synthetic material having the properties of rubber in which the material is permitted to deform under application of a load but in which the material resumes its original shape upon removal of the deforming force or load.

Figure 3:
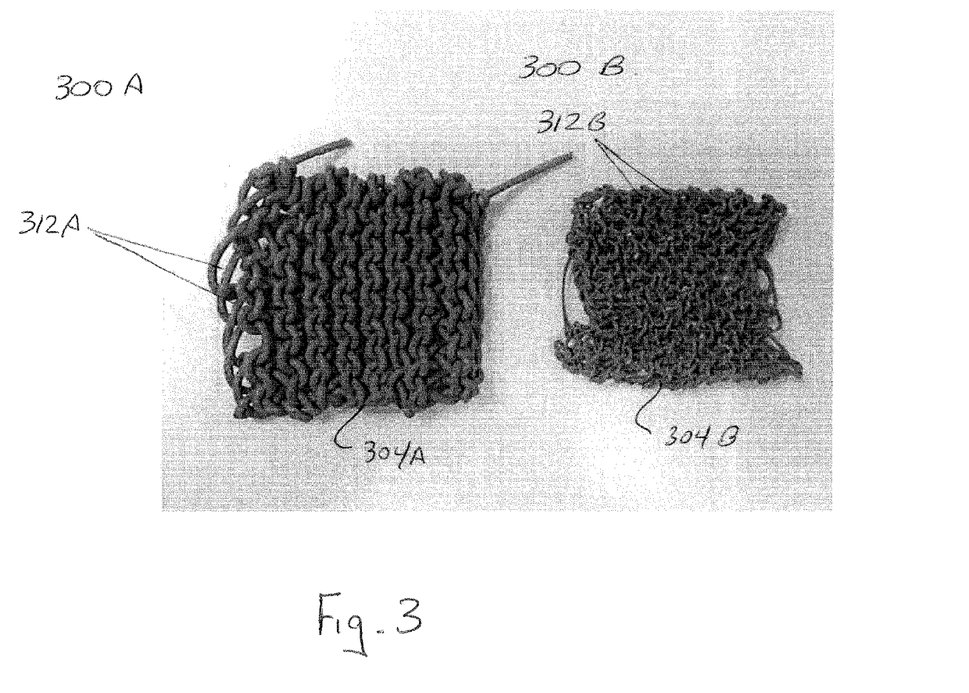
FIG. 3 is a perspective view of vibratory damping apparatus of differing size that are each made in accordance with an exemplary embodiment.

Referring to FIG. 3, there are shown vibratory damping apparatus 300A, 300B made in accordance with a first exemplary embodiment. In general, each depicted vibratory damping apparatus 300A, 300B is commonly defined by threads or cords that are made from an elastomeric material having a defined diameter wherein the material is formed into a knitted arrangement 304A, 304B defined herein by a series of adjacent loops or loop portions 312A, 312B that are configured into a two-dimensional mesh pattern. The loops 312A, 312B in each apparatus 300A, 300B are not bonded to one another and are therefore independent in terms of their behavior and the elastic character of the thread material. The size of the loops 312A, 312E including the density of the defined mesh as well as the diameter of the thread or cords of the elastomeric material can be varied as depicted, by way of example only, according to FIG. 3.

The knitted arrangement in each instance takes on the form of a sheet that can be wrapped directly about a structural component, such as a pipe, and secured thereto using clips, hooks or the like. Alternatively, the knitted apparatus 300A, 300B can be hung from a structural component or could be arranged into other shapes, such as, for example, a knitted sleeve or tubular design that is configured to be fitted in overlaying relation onto an object for purposes of damping.

According to another embodiment, an outer layer, such as a metal tape or other suitably rigid material can be applied onto at least a portion of the knitted arrangement and optionally secured, such as by using adhesives or other attaching means as in the instance of a metal tape. Alternatively, the outer layer can be simply placed in overlaying relation onto a portion of the knitted arrangement. In either event and for purposes of damping, the applied outer layer forms a constrained layer boundary, as compared to the highly flexible knitted arrangement provided by the multiple independent loops of elastomeric material.

Figure 9:
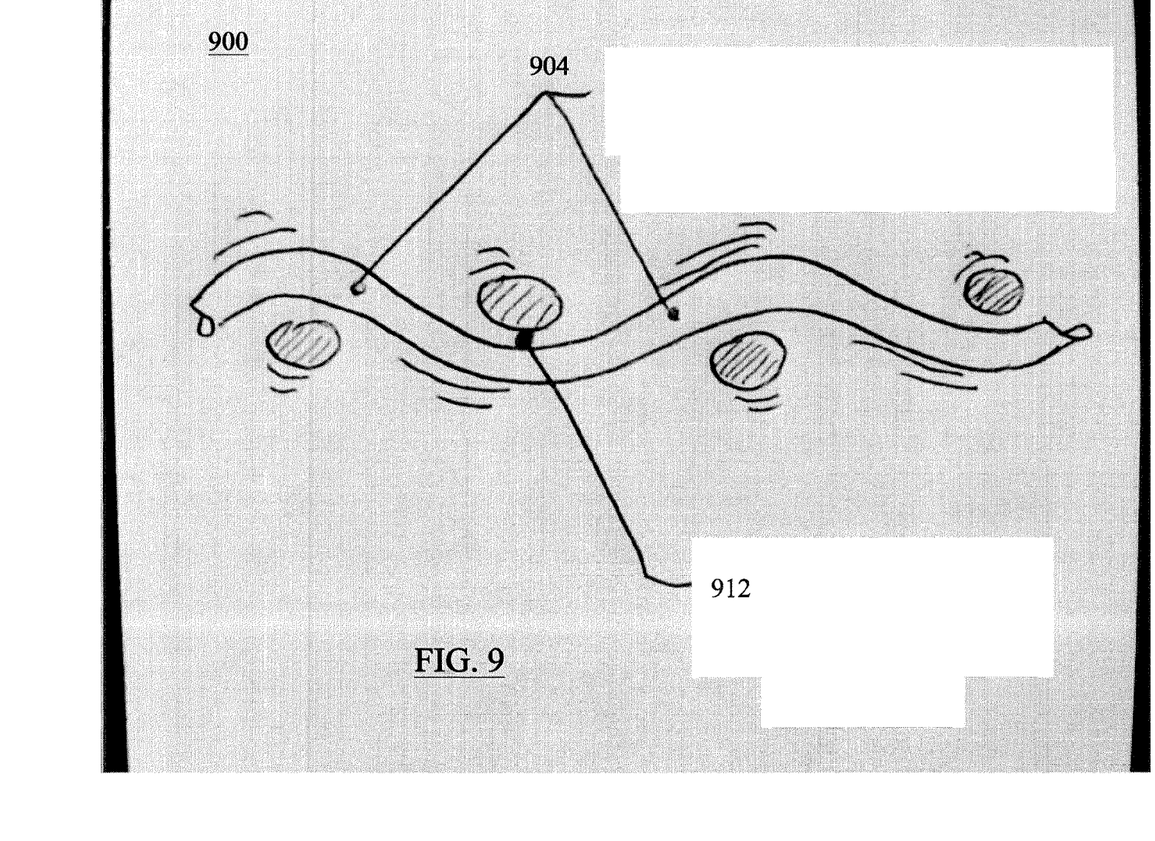
FIG. 9 is a sectioned view of a portion of a knitted elastomer damping apparatus, illustrating effects of an applied load upon the apparatus.

In operation and following the attachment of the knitted arrangement to a structural component, an applied load to the structural component causes the adjacent loops of the knitted arrangement to act independently relative to one another, as shown in part according to an apparatus partially shown in section in FIG. 9. That is, each of the loops 904 of the knitted arrangement is configured to vibrate as shown at 912 in response to an input load independently of the remaining adjacent loops. Therefore, the degree of damping of the apparatus 900 can be controlled such that the knitted loops 904 can achieve resonance at various frequencies, depending, for example, upon the length of the loops. In addition, the size of the adjacent loops as well as the density of the formed mesh/knit and the size of the elastomeric thread or cords used can also be suitably varied in order to control damping characteristics in addition to varying the properties of the elastomeric material that is used.

Advantageously, the knitted loop/mesh structure of the herein described damping apparatus enables heat to be directed for dissipation, as well as structure borne noise attenuation.

As noted, the formed and knitted elastomeric sheet can be attached in overlaying relation onto a structural component, such as a pipe or rod, or can be hung therefrom. In yet another version, the damping apparatus could be interposed directly between a pair of structures (not shown) in which the knitted elastomeric sheet would be compressed therebetween.

EXAMPLE 1

Figure 4:
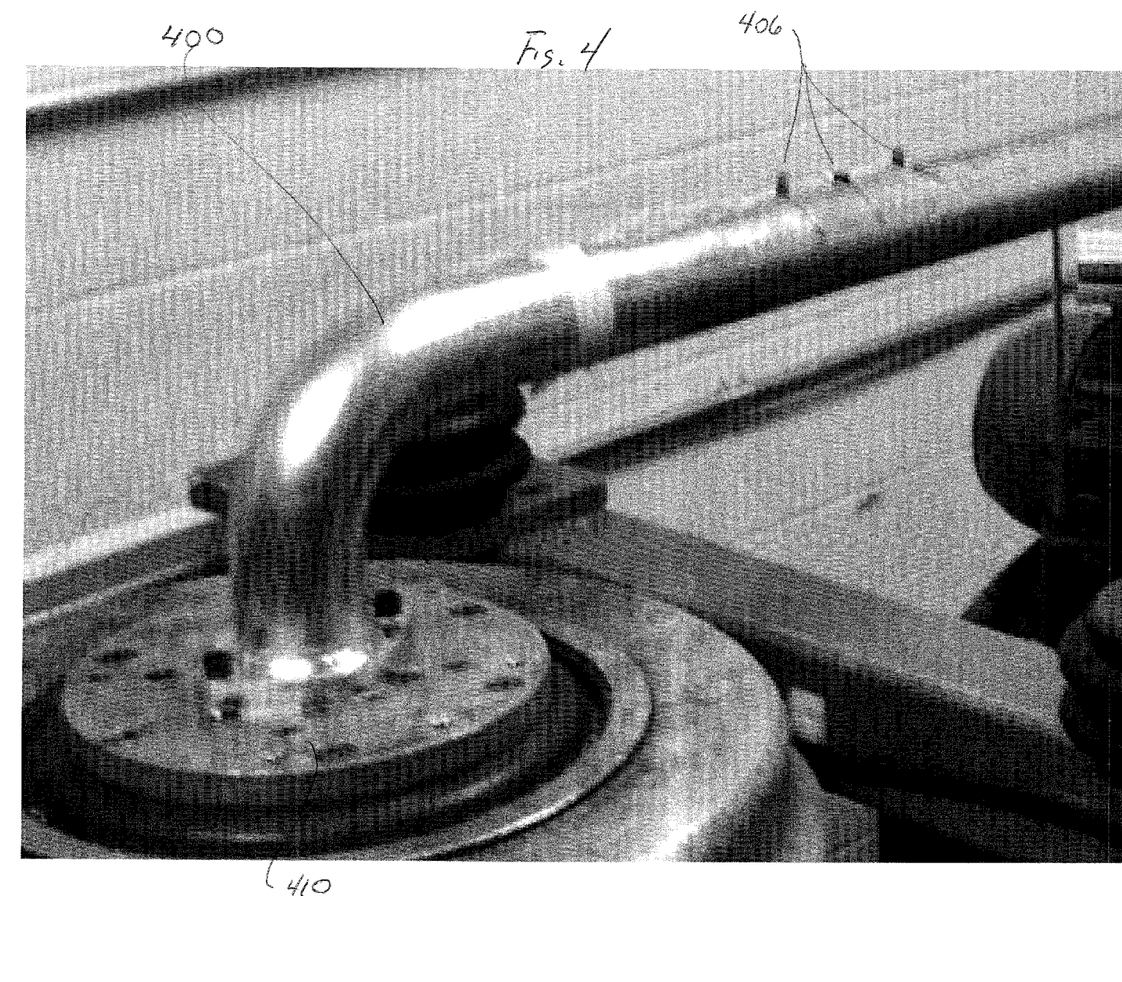
FIG. 4 is a perspective view of a structural component as configured to a test fixture.

By way of example and referring to FIGS. 4-8, an example of a structural element configured to receive an applied load was configured for purposes of comparison of the herein described vibration damping apparatus with other known damping apparatus. Referring first to FIG. 4, a pipe element 400 was used as a structural component under load, wherein one end of the pipe element was attached to a vibration device 410 and the remaining end (not shown) was attached to a fixed structure with a spanning axial portion therebetween. A plurality of sensors, such as accelerometers 406, were attached to the exterior of the pipe element at a position intermediate the vibration device 410 and the opposing fixed end.

Figure 5:
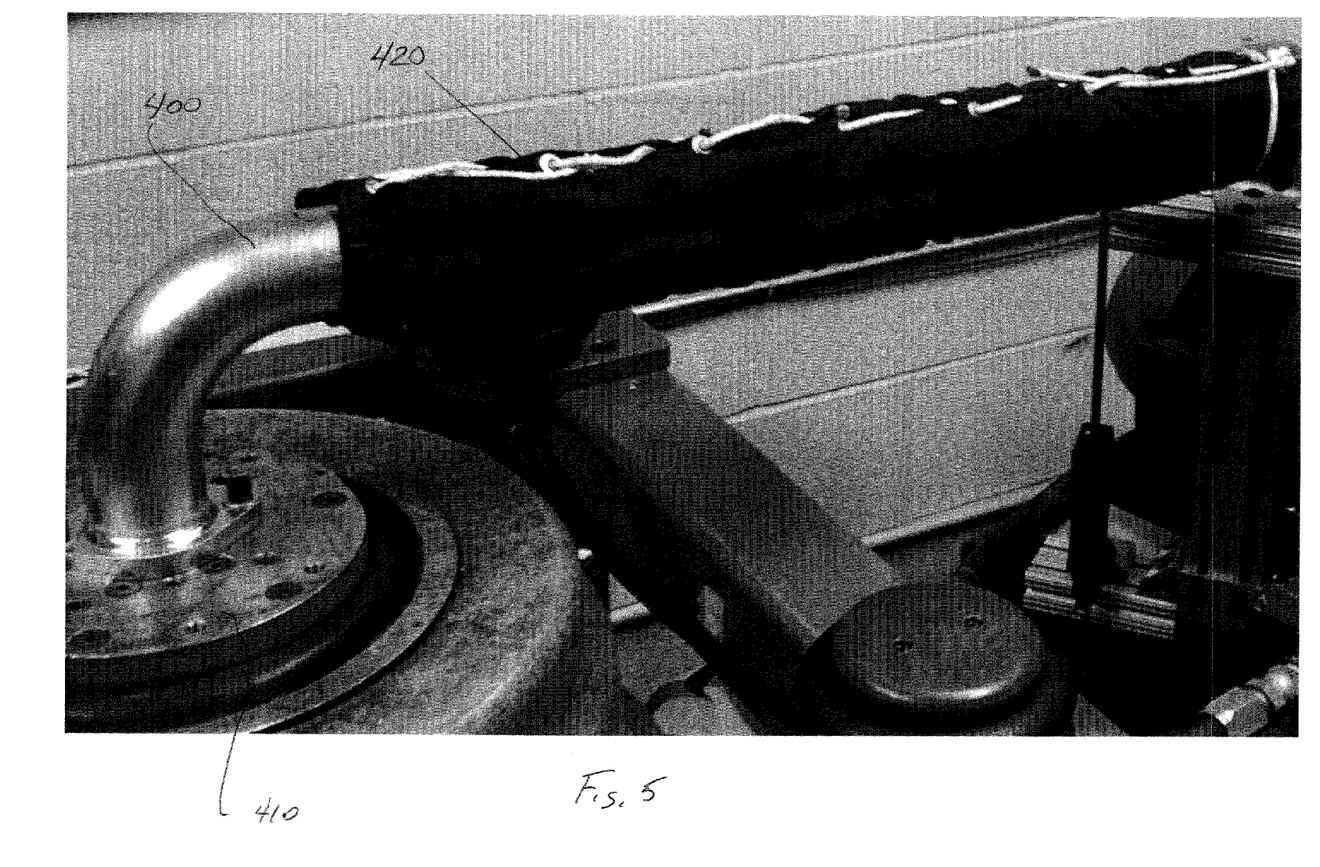
FIG. 5 is a perspective view of the structural component of FIG. 4, further including a known damping apparatus attached thereto.

Referring to FIG. 5, a flexible damping sleeve 420 made from Nomex similar to that defined in U.S. Patent Application Publication No. 2013-0105262A1, previously incorporated by reference in its entirety is provided. According to this version, the material of the damping sleeve 420 was sewn into a sleeve-like member having a plurality of baffles of equal length, which was wrapped about the outer circumference of the spanning axial portion of the pipe element 400, as shown.

Figure 6:
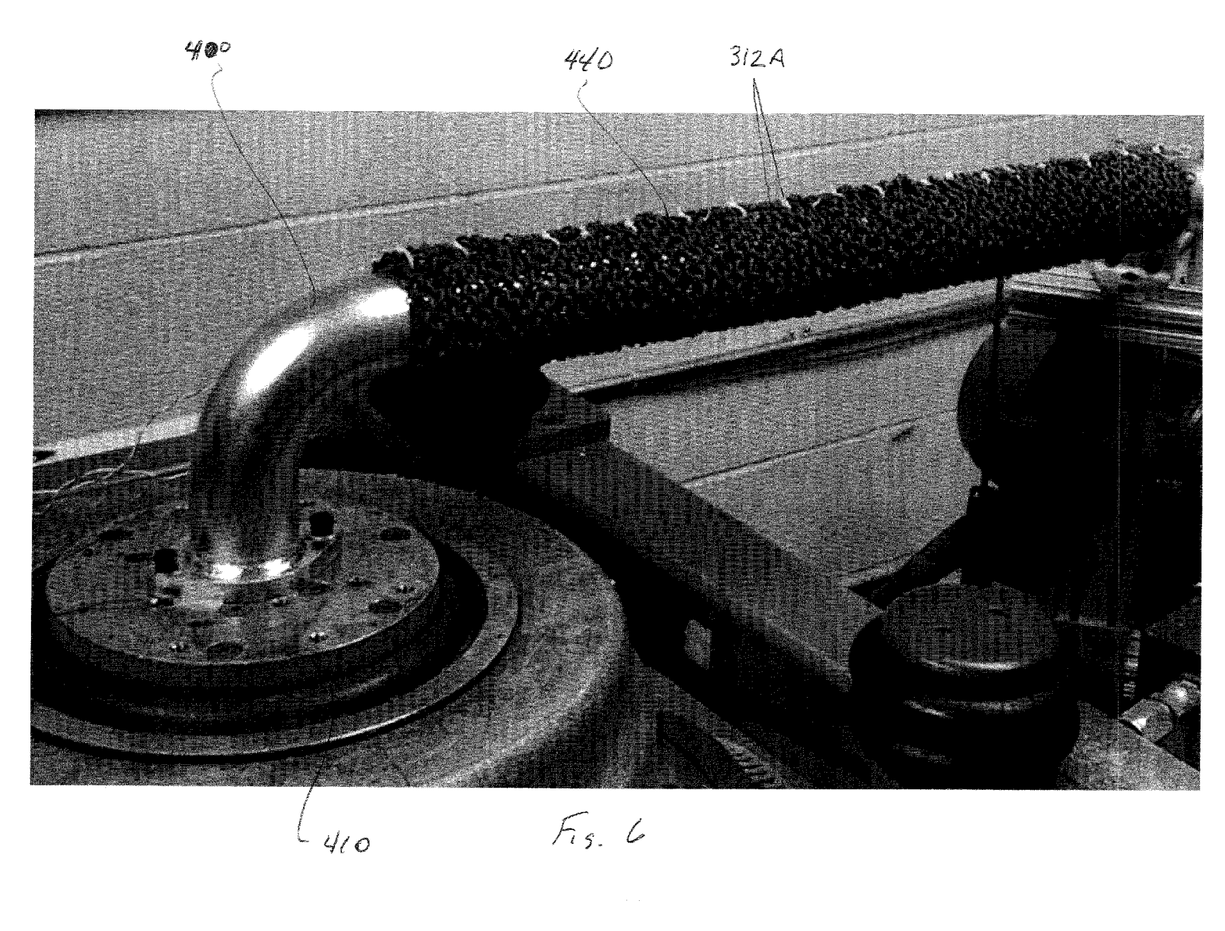
FIG. 6 is a perspective view of the structural component of FIG. 4, further including a vibratory damping apparatus of FIG. 3 attached thereto.

Referring to FIG. 6, an elastomeric mesh sheet 440 similar to those shown in FIG. 3 and having a knitted configuration including a plurality of adjacent loops 312A is attached to the spanning axial portion of the pipe element 400. The sheet 440 used for this comparison is made from a single elastomeric material with the loops 312A having the same size distributed throughout and having the same overall length as that of the damping sleeve 420, FIG. 5.

Figure 7:
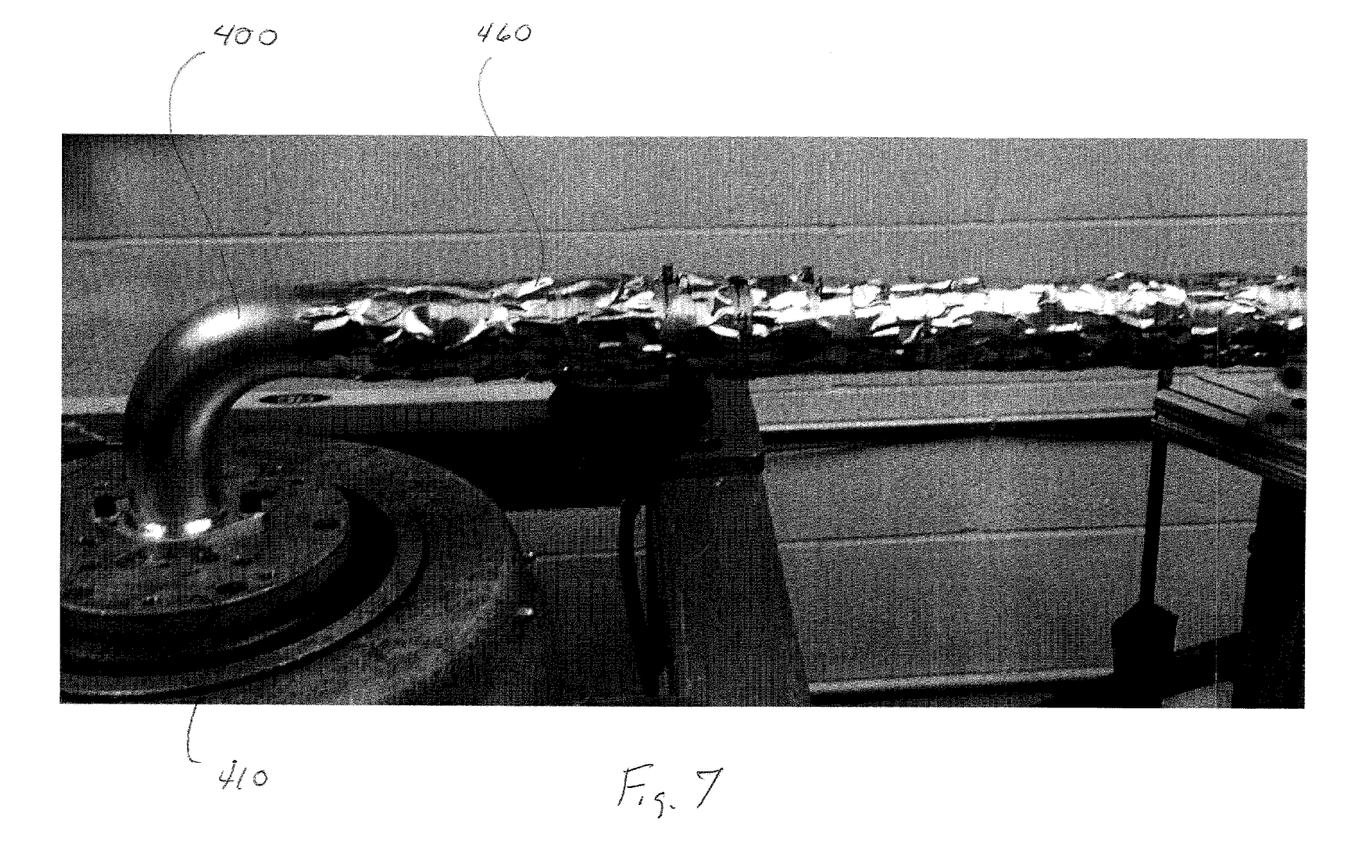
FIG. 7 is a perspective view of the structural component of FIG. 4, further including an equivalent mass metal tape attached thereto.

Referring to FIG. 7, a constrained mass 460 is attached to the exterior of the spanning axial portion of the pipe element 400. The constrained mass 460 is defined according to this specific example by a metal adhesive tape 464 applied along with an equivalent mass, the mass being equivalent that of the elastomeric mesh sheet 440, FIG. 5, and damping sleeve 420, FIG. 6, and having an equivalent length.

Figure 8:
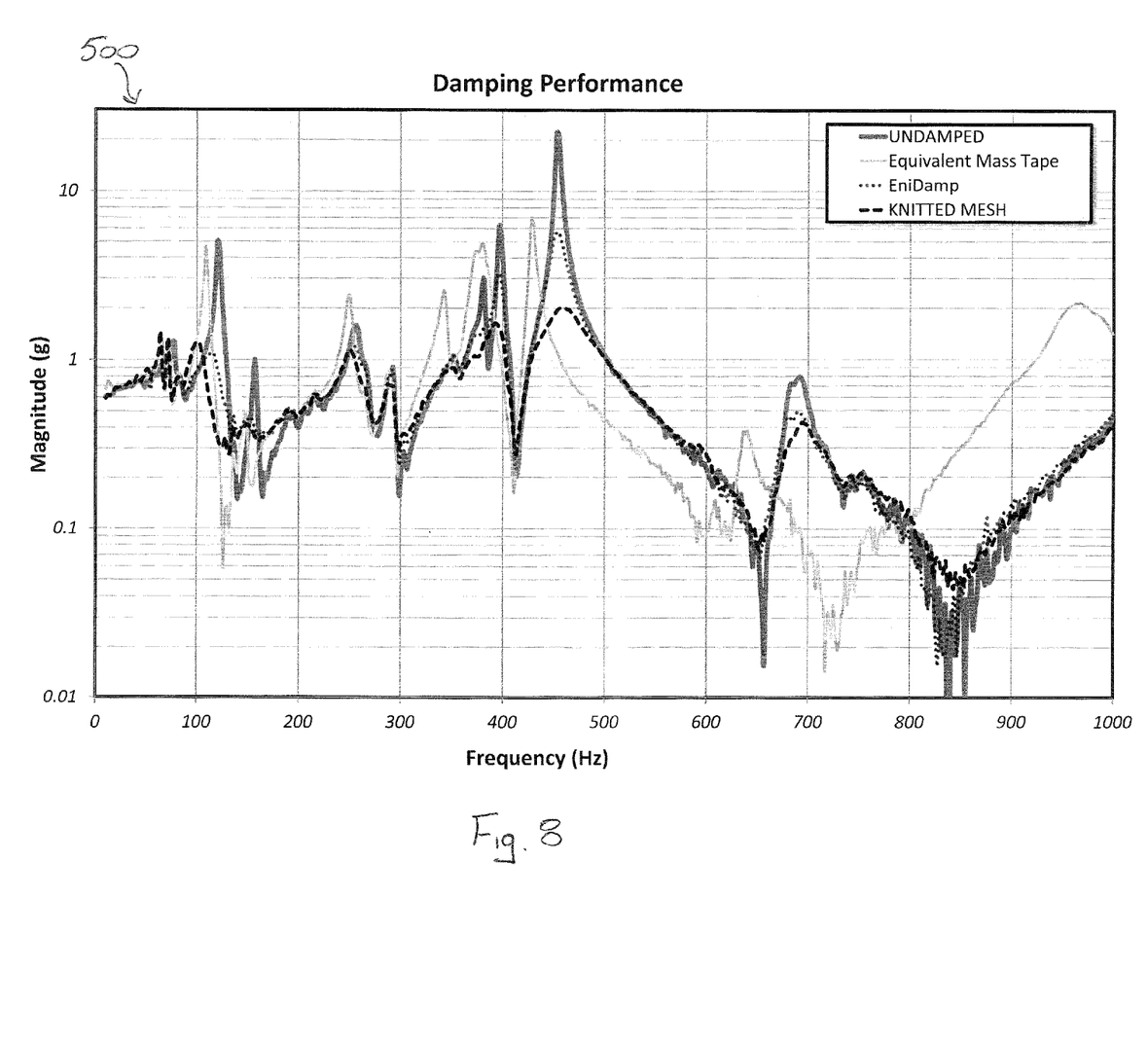
FIG. 8 is a graphical representation comparing frequency response of the structural component as configured with the damping apparatus of FIGS. 5-7, and further compared to an undamped structural component as configured in FIG. 4.

Referring to FIG. 8, a comparison is shown graphically for a series of loads applied to the pipe element 400 as individually configured according each of FIGS. 4-7, including an undamped (FIG. 5) pipe element as well as configurations having the damping sleeve 420 (listed as "Enidamp"), the elastomeric mesh sheet 440 and the equivalent mass 460. For each applied damping apparatus, a series of input loads are made to the pipe element 400 over a defined range of input frequencies covering 0 to 1000 Hz as shown in the plot 500, superimposing the results of this loading.

According to the depicted comparison, first, second and third resonant modes are respectively formed, at about 120 Hz, 400 Hz and 450 Hz. As shown by the graphical comparison and though each damping apparatus provided some level of effectiveness as indicated at 522, 524 as compared to the undamped element 520, the response 528 of the knitted elastomeric sheet 440 clearly demonstrated the most consistent response in terms of both frequency response and velocity response over the herein broadly defined spectrum of input frequencies.

PARTS LIST FOR FIGS. 1-9

300A vibratory damping apparatus
300B vibratory damping apparatus
308 knitted arrangement
312A adjacent loops
312B adjacent loops
400 structural components
406 accelerometers
410 vibration apparatus
420 damped sleeve
440 elastomeric mesh sheet
460 constrained mass
500 plot
520 response curve, undamped
522 response curve, damping sleeve
524 response curve, constrained mass
528 response curve, elastomeric mesh
700 vibratory damping apparatus
704 enclosure
708 side, enclosure
712 side, enclosure
715 center seam
717 interior cavity
719 interior cavity
721 interior cavity
725 top edge
727 bottom edge
731 outer edge
735 outer edge
737 border portion
740 engagement members
900 damping apparatus
904 loops
912 damping It will be readily apparent that other modifications and variations can be contemplated that utilize at least one of the inventive concepts described herein and according to following appended claims.

The invention claimed is:

1. A flexible vibratory apparatus for damping a structure or structural component, the apparatus comprising:
   a knitted mesh made from cords or threads of an elastomeric material, the knitted mesh having a plurality of adjacent elastomeric loops,
   the knitted mesh being porous to dissipate heat from one side of the knitted mesh to an opposite side of the knitted mesh,
   wherein the knitted mesh is configured to be wrapped or otherwise supported onto the structure or structural component in which each of the plurality of loops resonates independently when subjected to a vibratory load applied to the structure or structural component, thereby enabling the knitted mesh to attenuate vibrations collectively and achieve resonance at more than one input frequency of the vibratory load.

2. The flexible vibratory apparatus according to claim 1, further comprising a rigid or semi-rigid outer layer disposed in relation to a portion of an exterior surface of the knitted mesh.

3. The flexible vibratory apparatus according to claim 2, wherein the outer layer forms a constrained boundary.

4. The flexible vibratory apparatus according to claim 3, in which the outer layer is adhesively attached to the exterior surface of the knitted mesh.

5. The flexible vibratory apparatus according to claim 1, wherein the knitted mesh is compressible.

6. The flexible vibratory apparatus according to claim 5, wherein the knitted mesh is compressible in a direction of the loops.

7. The flexible vibratory apparatus according to claim 5, wherein the knitted mesh is compressible in a direction that is transverse to the loops.

8. The flexible vibratory apparatus according to claim 1, in which the knitted mesh includes a first knitted portion having a plurality of adjacent loops defined by a first size and a second knitted portion having a plurality of loops defined by a second size that is different than the first size.

9. The flexible vibratory apparatus according to claim 1, in which portions of the knitted mesh are defined by at least one of different elastomeric cord or thread diameters, loop diameters or mesh densities in order to selectively vary damping characteristics of the apparatus.

10. The flexible vibratory apparatus of claim 1, in which the knitted mesh is formed as a tubular sleeve that is placed in overlaying relation onto the structural component.

11. A method of manufacturing and using a flexible vibratory damping apparatus, the method comprising:
   providing at least one elastomeric material;
   creating a knitted arrangement of the elastomeric material from cords or threads thereof as a sheet, the knitted arrangement including a plurality of adjacent loops to produce a porous knitted mesh from a first side of the knitted mesh to a second side of the knitted mesh; and
   hanging or wrapping the knitted arrangement in relation to a structural component wherein each of the loops of the knitted arrangement resonates independently when subjected to a vibratory load applied to the structural component and enables the sheet collectively to resonate at various input frequencies to attenuate vibrations, and in which the damping apparatus is porous to dissipate heat emitted from the structural component.

12. The method according to claim 11, further comprising the step of providing a rigid or semi-rigid outer layer about the exterior of the knitted arrangement.

13. The method according to claim 12, wherein the semi-rigid or rigid outer layer forms a constrained boundary.

14. The method according to claim 13, wherein the outer layer is adhesively attached to the exterior of the knitted arrangement.

15. The method according to claim 11, wherein the knitted arrangement is compressible in a direction that is transverse to the loops.

16. The method according to claim 11, further comprising the additional step of varying at least one of the loop size or elastomeric thread or cord diameter of the porous knitted mesh in order to selectively tune damping characteristics of the arrangement in relation to the structural component.

17. The method according to claim 11, including the additional step of providing a first knitted portion having a first mesh size and a second knitted portion having a second mesh size that is different from the first mesh size in order to vary damping characteristics of the apparatus.

18. The method of claim 11, further comprising forming the sheet into a tubular sleeve and placing the tubular sleeve over the structural component.

19. A damping apparatus comprising:
   a flexible sheet of elastomeric material configured to be disposed directly over a vibration prone structure, the flexible sheet including a knitted arrangement of elastomeric threads or cords forming a plurality of loops, each loop having a characteristic geometric shape in which each loop resonates independently when a vibratory load is applied to the vibration prone structure in which the sheet collectively produces a resonant response to attenuate vibrations acting on the vibration prone structure, and wherein the knitted arrangement produces a porous structure configured to dissipate heat from one side of the knitted arrangement to an opposite side thereof.

20. The apparatus of claim 19, wherein the plurality of loops include a characteristic geometric shape and geometric material including at least one from the group consisting of length, thickness, and density.

21. The apparatus of claim 19, further comprising an overwrap to apply a load operative to press the loops together to vary the resonance characteristics of the apparatus.

22. The apparatus of claim 19, wherein the flexible sheet of elastomeric material defines a first knitted portion and a second knitted portion, the first knitted portion having a first mesh size and the second knitted portion having a second mesh size that is different from the first mesh size.

23. The apparatus of claim 19, in which the flexible sheet is formed into a tubular sleeve configured to be placed directly over the vibration prone structure.

24. An apparatus for attenuating the vibrations of a vibration prone structure, comprising:
   a knitted weave of elastomeric threads forming a plurality of loops resonating independently relative to one another at a variety of frequencies such that vibrations are attenuated at different frequencies and in which the knitted weave is porous to dissipate heat from one side of the knitted weave to the other side of the knitted weave.

25. The apparatus of claim 24, further comprising a rigid or semi-rigid outer layer disposed over a portion of the knitted weave.

26. The apparatus of claim 25, wherein the outer layer forms a constrained boundary.

27. The apparatus of claim 25, wherein the rigid or semi-rigid outer layer further comprises an overwrap operative to compress the loops to vary the resonance characteristics of the damping apparatus.

28. The apparatus of claim 24, wherein the plurality of loops include a characteristic geometric shape and geometric material including one from the group consisting of length, thickness, and density.

29. The apparatus of claim 24, wherein the knitted weave is compressible.

* * * * *

UNITED STATES PATENT AND TRADEMARK OFFICE
CERTIFICATE OF CORRECTION

PATENT NO. : 10,072,720 B2
APPLICATION NO. : 14/574631
DATED : September 11, 2018
INVENTOR(S) : Mark J. Ott Page 1 of 1

It is certified that error appears in the above-identified patent and that said Letters Patent is hereby corrected as shown below:

Item (56) References Cited
FOREIGN PATENT DOCUMENTS
Change "8,332,168 B2" to --8,322,168 B2--

Signed and Sealed this
Twenty-fifth Day of December, 2018

Andrei Iancu
*Director of the United States Patent and Trademark Office*